W. KIRSCH.
QUICK ROASTING APPARATUS.
APPLICATION FILED APR. 19, 1913.

1,122,610.

Patented Dec. 29, 1914.

3 SHEETS—SHEET 1.

WITNESSES:
John C. Sanders
M. B. Cottrell

INVENTOR:
Wilhelm Kirsch
BY M. Wallace White
ATTY

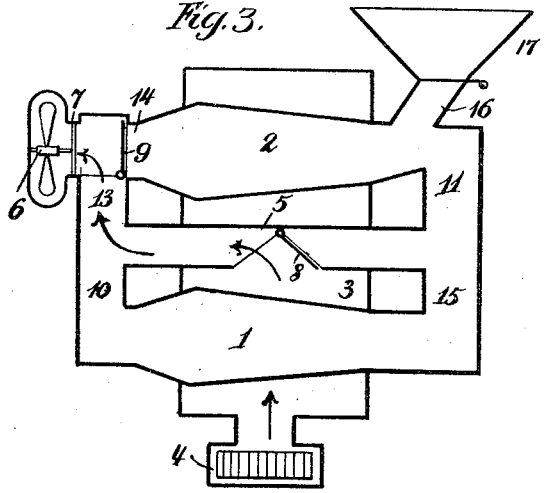
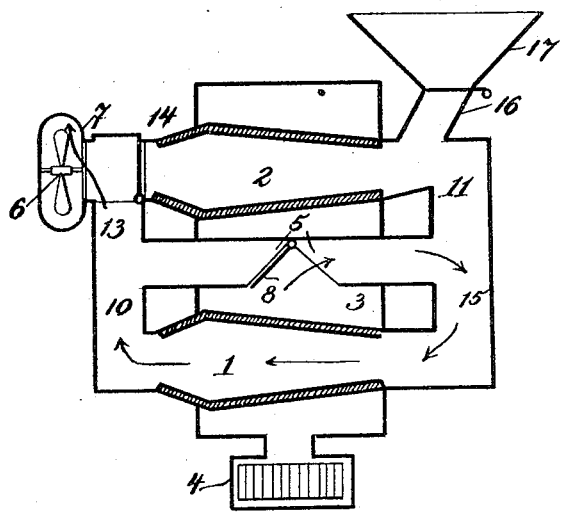

W. KIRSCH
QUICK ROASTING APPARATUS.
APPLICATION FILED APR. 19, 1913.

1,122,610.

Patented Dec. 29, 1914.
3 SHEETS—SHEET 3.

WITNESSES:
John C. Sanders
M. B. Cottrell

INVENTOR:
Wilhelm Kirsch
By M. Wallace White
ATT'Y

UNITED STATES PATENT OFFICE.

WILHELM KIRSCH, OF HEILBRONN, GERMANY.

QUICK-ROASTING APPARATUS.

1,122,610.  Specification of Letters Patent.  Patented Dec. 29, 1914.

Application filed April 19, 1913. Serial No. 762,407.

*To all whom it may concern:*

Be it known that I, WILHELM KIRSCH, a citizen of the German Empire, residing at Heilbronn a. N., Wurttemberg, Germany, have invented certain new and useful Improvements in Quick-Roasting Apparatus, of which the following is a specification.

The object of this present invention is a roasting plant with roasting drums inclosed in a joint casing; one of which has to serve as preliminary roasting drum and the other as finishing roasting drum. This plant is characterized by the fact, that by means of valves inserted into the heating canals, the roasting heat can be controlled in such a manner that according to requirements either the one or the other drum may be wholly disconnected or heated either both inside and outside or only from the outside. In order to facilitate this, the drums have been connected on both their frontal sides with canals, in two of which valves have been arranged at suitable spots, so that by virtue of their position the roast-gases, notoriously produced by heating ovens, are either completely shut off from the interior of the drums, allowing the gases to operate only from the outside on the drums, or these gases are conducted only through the upper or only through the lower drum, while playing around the other drum only on the outside. A further alternative for the roasting gases directs them successively through the lower drum and thence through the upper one as in the other cases, when they will play on the drums simultaneously from the outside. This arrangement facilitates a complete utilization of the generated roasting gases.

Figure 1:
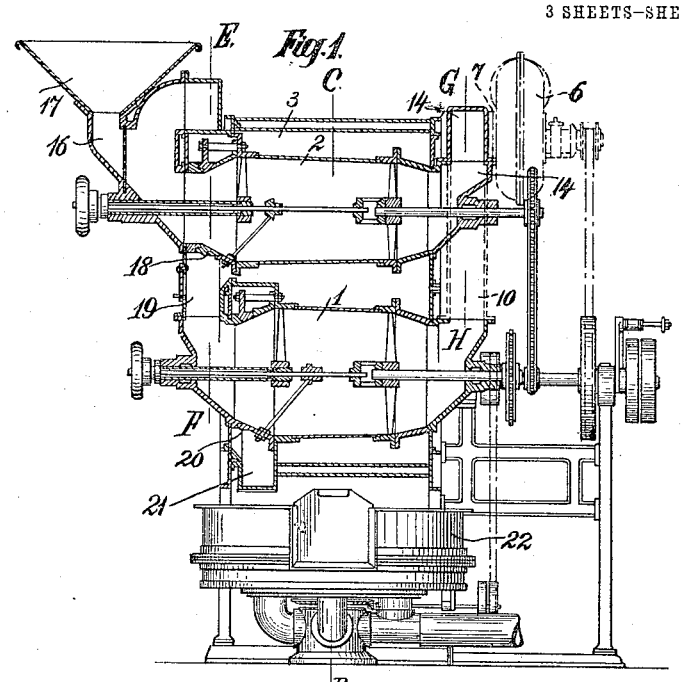
Figure 2:
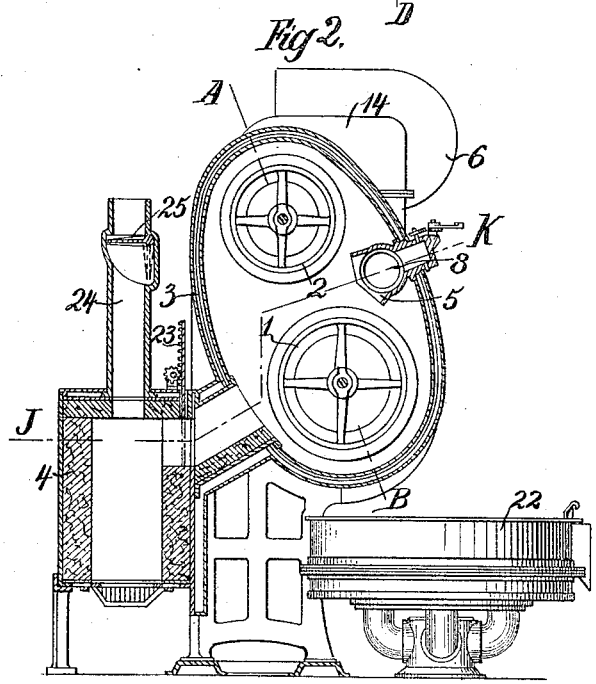
Figure 5:
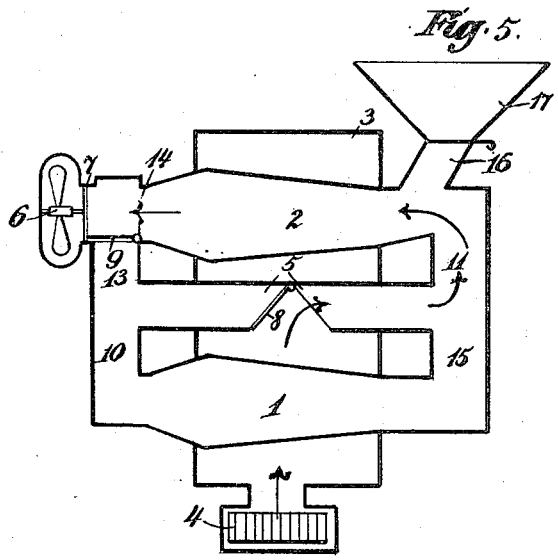
Figure 6:
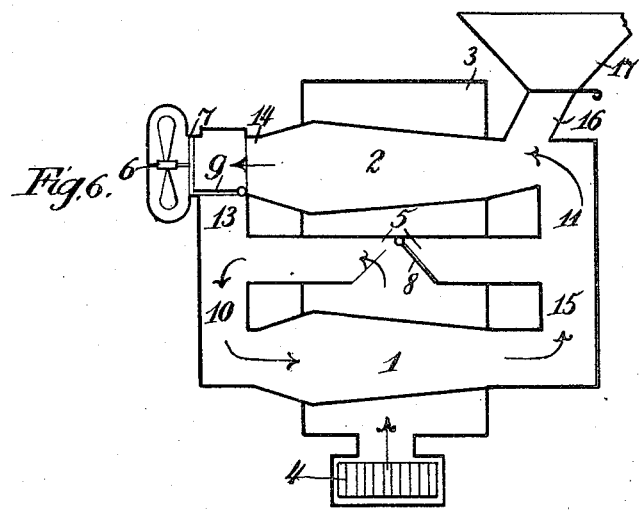

The illustrations comprise the following figures 1–6, showing a quick-roasting apparatus, as follows:

Figure 1 a longitudinal section along line A—B of Fig. 2. Fig. 2 a vertical cross section along line C—D of Fig. 1. Figs. 3, 4, 5 and 6 represent diagrammatically the position of the valves for conducting the roasting gases.

The two roasting drums 1 and 2 are inclosed in a joint casing 3 which is connected with a heating arrangement 4.

Two distributing canals 5 are fixed within the casing 3 which is constructed to serve as a heating chamber, and these canals are connected with the roasting drums 1 and 2 as well as with the exhauster 6 by means of additional canals. Movable valves 8 and 9 are arranged in the distributing canals 5 and in the canal 7 leading to the exhauster, through which the heating gases may be directed as circumstances require, with the result, that they are either shut off from the interior of the drum or may pass through one or other or both drums.

The distributing canal 5 is connected with the lower roasting drum 1 by means of the canal 10 while the other distributing canal is connected with the upper roasting drum 2 by means of the canal 11. The canal 10 is continued upward through the canal 13 and the trunk 14, which latter again is connected with the roasting drum 2, while at the junction of the canal 13 and the trunk 14 we see the exhauster 6 attached. The valve 9 is arranged within the canal 13 in such a manner, that it permits the closure either of the canal 13 or of the trunks 14. The canal 11 is continued downward into the canal 15, which is connected with the lower roasting drum 1, while the short trunk 16 connects the fill-up funnel 17 with the canal 11. From the discharge valve 18 of the upper roasting drum 2 a trunk 19 leads to the lower roasting drum 1 and from the discharge valve 20 of this latter a trunk 21 leads to the cooling strainer 22.

The apparatus works in the following manner: The slide 23 arranged between the heating arrangement 4 and the heating chamber 3 has to be closed and on the other hand the valve 25 provided in the chimney 24 has to be opened, whereupon the oven 4 is gradually heated with wood followed by coke. As soon as this latter is consumed so far, that no more great discharge of smoke need be apprehended, let the slide 23 be opened and the valve 25 closed, whereupon the exhauster 6 is started. With the object of preventing any contact of the still unpurified and smoky heating gases with the interior of the drum, it is necessary to switch the valve 8 within the distributing canal 5 and the valve 9 in front of the exhauster 6 in such a way, that the heating gases are being absorbed by canal 13, during which process the valve 9 closes the trunk 14. As soon as the coke is fully aglow and smoking has ceased, the valve 9 has to be turned down, so that it closes the canal 13 and in like manner is the valve 8 in the distributing canal 5 turned down, enabling the heating gases to pass from the heating chamber 3 to the exhauster through canal 11 the upper roasting drum 2 and through the canal 7; finally the raw material is deposited in the upper drum 2 as soon as the slide 26 is opened. When the raw material in the upper drum 2 begins to color up the valve 8 in the distributing canal 5 has to be switched off again in order to permit the roasting gases to enter the lower drum 1 through the canal 10. Thence they will pass the canals 15 and 11 of the upper drum 2, arriving finally at the exhauster 6 after passing canal 7. The upper drum 2 thereupon has to be emptied into the lower one by the act of opening the discharge valve 18 and is forthwith refilled with fresh material, which undergoes preliminary roasting while the goods in the lower drum are being finished. As soon as the goods in the lower drum have attained the requisite degree of roasting the valve 8 is turned over again, so that the roasting gases are excluded from the lower drum and enabled to return to the upper one. When the goods in the lower drum are done, let the discharge valve 20 of the same be opened so as to permit said goods to reach the cooling sieve 22 through the trunk 21, whereupon the upper drum 2 is emptied into the lower one and at once re-charged with fresh material. Finally the valve 8 has to be turned over again, so that the roasting gases may again pass through both drums.

What I claim and desire to secure by Letters Patent is:

1. In a roasting apparatus, in combination, a casing, two roasting drums within said casing, a heater communicating with the interior of said casing, conduits communicating with the interior of said casing and with said drums, and means for controlling the flow of the gases from the heater through said conduits and drums.

2. In a roasting apparatus, in combination, a casing, two roasting drums within said casing, a heater communicating with the interior of said casing, two conduits communicating with the interior of said casing and with said drums, and a valve adapted to close either one of said conduits whereby the direction of flow of the heated gases from the heater may be controlled.

In testimony whereof I affix my signature in presence of two witnesses.

WILHELM KIRSCH.

Witnesses:
 JEAN GÜLDEN,
 ROSA THALBAUER.

Copies of this patent may be obtained for five cents each, by addressing the "Commissioner of Patents, Washington, D. C."